Feb. 18, 1941.   E. L. BARRETT   2,231,873
DIRECT CURRENT TRANSFORMING DEVICE
Filed Feb. 12, 1934

Inventor:
Edward L. Barrett,
By Chindahl, Parker & Carbon
Attys

Patented Feb. 18, 1941

2,231,873

UNITED STATES PATENT OFFICE

2,231,873

DIRECT CURRENT TRANSFORMING DEVICE

Edward L. Barrett, La Grange, Ill., assignor, by mesne assignments, to The Crosley Corporation, Cincinnati, Ohio, a corporation of Ohio Application February 12, 1934, Serial No. 710,778

12 Claims. (Cl. 171—97)

The invention relates to direct current transforming systems and more particularly to devices for increasing the potential of a direct current from a source of relatively low potential. Devices of the type to which this invention relates are shown and described in my copending application Serial No. 615,553, filed June 6, 1932, now Patent No. 1,946,563, dated February 13, 1934, of which this application is a continuation in part.

An object of the invention is to provide a new and improved device of this nature which, while being eminently suitable for many other uses, is especially adapted for use with radio receiving sets wherein the current is derived from a battery.

Another object of the invention is to provide a novel system for efficiently transforming direct current from a source of relatively low potential into an alternating current of relatively high potential and thence into a direct current of relatively high potential, and which embodies a particular relationship of elements whereby electrical discharges or sparking within the system is completely eliminated.

Another object of the invention is to provide a novel direct current transforming system embodying means for transforming direct current into alternating current and thence into direct current, and which includes capacitance connected into the system in close association with the transforming means to attain elimination of sparking in the system with maximum efficiency and protection to the several elements of the system.

A further object of the invention resides in the provision, in a direct current transforming system which embodies mechanical means for rectifying an alternating current induced in a transformer by an interrupted direct exciting current, of means for effecting a balanced and coordinated relationship of various of the elements comprising the system whereby the potential difference across the contact points of the mechanical rectifier is substantially zero at the instant of making or breaking the rectifier circuit controlled by said contact points.

Another object of the invention is to provide a system of this character wherein interruptions of the direct exciting current for the transformer are effected by an electromagnetically actuated vibratory reed mechanism and which embodies capacitance of ample value to prevent an initial vibration of the reed at less than its full amplitude of swing under starting conditions in which there is no load on the system.

Other objects and advantages will become apparent in the following description and from the accompanying drawing, in which.

Figure 1:
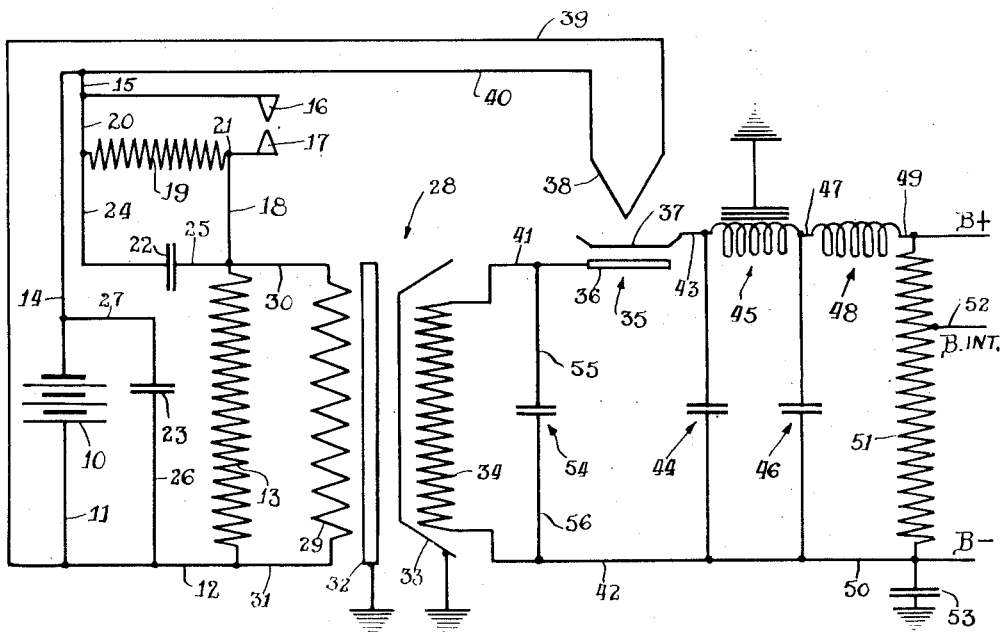
Figure 1 is a wiring diagram illustrating the circuit embodying the features of the invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Direct current transforming devices of the character herein disclosed are particularly well adapted for use in connection with motor vehicle installations of radio receiving apparatus. In such an environment, the storage battery of the vehicle is a convenient source of direct current of low potential and the instant devices transform such low potential into high potential suitable for energization of the high potential or so-called "B" circuit of the receiving apparatus.

Direct current transforming devices embodying the present invention comprise generally a transformer having a primary winding connected for energization by the storage battery through a circuit which includes a current interrupting device, and a secondary winding in which alternating current of high potential is induced by the interruptions of the primary current. The secondary winding is connected in an output circuit which includes rectifying means for converting the high potential alternating current into pulsating direct current and a filter system effective to eliminate the pulsations and to produce substantially pure direct current of high potential.

Rectification may be accomplished by a rectifier valve which operates electrically, or by mechanical means which rectifies by driven contacts arranged properly to establish connections in the alternating current circuit so that current flowing only in one direction is delivered to the filter system.

Referring to the drawing, Fig. 1 is illustrative of the arrangement and organization of elements in a system which embodies a rectifier valve. Therein, 10 designates a source of low potential direct current such as the storage battery of a vehicle. Leads 11 and 12 from one side of the storage battery 10 connect with one side of a winding 13 of a suitable circuit interrupting device, herein shown as being of the buzzer type. The other side of the battery is connected by leads 14 and 15 with one contact 16 of the interrupting device. The other and cooperating contact 17 is connected by a lead 18 with the other side of the winding 13.

As is customary in this type of interrupting device, one of the contacts, for instance herein the contact 16, is movable upon attraction thereof by the energization of winding 13 to break the circuit through the contacts and to allow the movable contact to return to the normal position thereof in which the circuit is closed. If desired, a relatively high resistor 19 may be connected in shunt, as indicated at 20, 21, across the leads 15, 18 to prevent the circuit through the contacts from being completely opened at any time. Moreover, capacitance 22, 23 in the form of condensers of relatively small capacity may be shunted around the contacts 16 and 17 and across the leads 12 and 14 by leads 24, 25 and 26, 27, respectively, to suppress any interference in this part of the system resulting from the operation of the circuit interrupting device.

When the interrupting device is in operation, a direct current of relatively low potential flowing from the storage battery 10 becomes an interrupted current of like potential. An increase in potential is obtained by means of a transformer 28 having a primary winding 29 which is connected, in this instance by leads 30, 31, in parallel with the winding 13 of the interrupting device. The transformer may be of the type which embodies a grounded core 32 and grounded static shield 33. The current which is induced in a secondary winding 34 of the transformer 28 as a result of the intermittent energization of the primary winding 29 is an alternating current of relatively high potential. This current is rectified by a thermionic valve 35 which embodies a plate element 36, an ion emitting or cathode element 37, and a heating element 38. The heating element is energized by a circuit which is electrically independent of the secondary circuit and to this end the heating element is connected by a lead 39 and lead 11 with one side of the storage battery 10 and by a lead 40 and lead 14 with the other side of said battery.

One side of the secondary winding 34 is connected by a lead 41 with the plate element 36 to produce in operation a current flow from the secondary winding through the plate element to the cathode element 37. An output lead 42 is connected with the other side of the secondary winding. Connected with the cathode 27 is a lead 43 and the leads 42, 43 connect with the input terminals of a suitable filter system. In this instance, the filter system embodies a condenser 44 shunted across the leads 42, 43, a grounded iron core choke coil 45 connected to the lead 43, a second condenser 46 shunted across a lead 47 from the other side of the iron core choke coil 45 and the lead 42, and an air core choke coil 48 connected to the lead 47. The other end of the air core choke coil 48 is connected to a lead 49 constituting the positive output terminal of the system, while the lead 42 extends, as indicated at 50, to provide the negative output terminal. If desired, a fixed resistance 51 may be connected across the output terminals and have an intermediate tap 52 constituting an auxiliary output terminal for supplying direct current of less than maximum potential. In some instances, the negative terminal 50 of the output circuit may be grounded through capacitance 53 whereby the system may be adapted for use in receiving sets having an ungrounded circuit adapted for connection with the output terminals 49 and 50.

In the operation of the device, a uni-directional flow of current from the battery 10 to the primary winding 29 occurs, which flow is intermittent due to the action of the interrupting device. An alternating current of relatively high potential is thereby produced in the secondary winding 34. The alternating current of high potential from the secondary winding is rectified by the valve 35 and is delivered therefrom in the form of pulsating direct current of relatively high potential. The filter system to which the pulsating direct current passes eliminates the pulsations, and a substantially pure direct current of relatively high potential is delivered to the output terminals 49, 50.

The excessively high potential fluctuations which are produced in the secondary winding are suppressed to a potential value which is substantially within the range required for proper operation of the system by means of capacitance which is connected in shunt with one of the windings of the transformer and between that winding and the next adjacent instrumentality of the system. Thus, a capacitance 54 is connected by leads 55 and 56 across the leads 41 and 42 from the secondary winding 34 and the point of connection is between the secondary winding and the rectifier valve 35. When the minimum capacity value of this condenser has been properly determined, and the value selected will be determined by the electrical characteristics of the system, excessively high potential values in the system will be eliminated together with the disadvantageous effects of such high potential values upon the various elements of the system.

In systems which embody a rectifier valve (see Fig. 1) such a device operates to deliver to the filter system only those portions of the alternating current which flow in one direction to the valve. Moreover, where, as in an operating transforming system, potential is always impressed upon the filter system, the rectifier valve will pass to the filter system only those portions of the constantly varying potentials of the alternating current which are in excess of the potential impressed upon the filter system. This is evident because, while current cannot flow from the filter system in a reverse direction when the potential of the alternating current in the secondary winding is lower than that of the filter system, due to the interposed rectifier valve, a current of low potential cannot flow into a system impressed with a higher potential. The action of the rectifier valve in thus passing current to the filter system may therefore be said to be automatically self-adjusting, in that all current from the secondary winding which is flowing in the proper direction and which is of a higher potential than that of the filter system, is passed to said system.

It has been found that interruption of the primary winding circuit, whether such interruption be simply a making and breaking of the circuit or a complete reversal of the direction of current flow into said winding, produces fluctuations or variations of potential in the secondary winding which reach high values greatly in excess of the potential required in the proper operation of a system of this type. Such high variations in a system using a rectifier valve are exceedingly disadvantageous. Thus, the high potentials may cause disintegration of the cooperating elements of the valve or produce arcing across the adjacent leads through the base of the valve or across the prong terminals or the socket connections. Such variations may also cause sparking between adjacent winding layers of the transformer and across the separable contacts by which the primary winding circuit is interrupted. Whatever the undesired action of these high potential fluctuations may be, the result thereof is the disintegration and ultimate destruction of the part or parts affected.

The present invention, therefore, provides means for suppressing these high potential fluctuations to confine the variations of potential substantially within the range required for proper operation of the system. This end is preferably accomplished by connecting capacitance in shunt with one of the transformer windings, preferably the secondary winding in a valve type of system. The capacitance is located between the ends of the winding which it shunts and the instrumentality next connected with said winding. For example, in the valve type of system a condenser is shunted across the secondary winding between said winding and the valve. This location of the condenser protects all of the elements of the circuit from the deleterious effect of whatever high potential fluctuations occur in the secondary winding. A proper minimum value of capacitance, depending upon the characteristics of the system, must be used to accomplish the desired end but an excess value does not appear to be disadvantageous other than in a loss of efficiency due to unnecessary current consumption.

Figure 2:
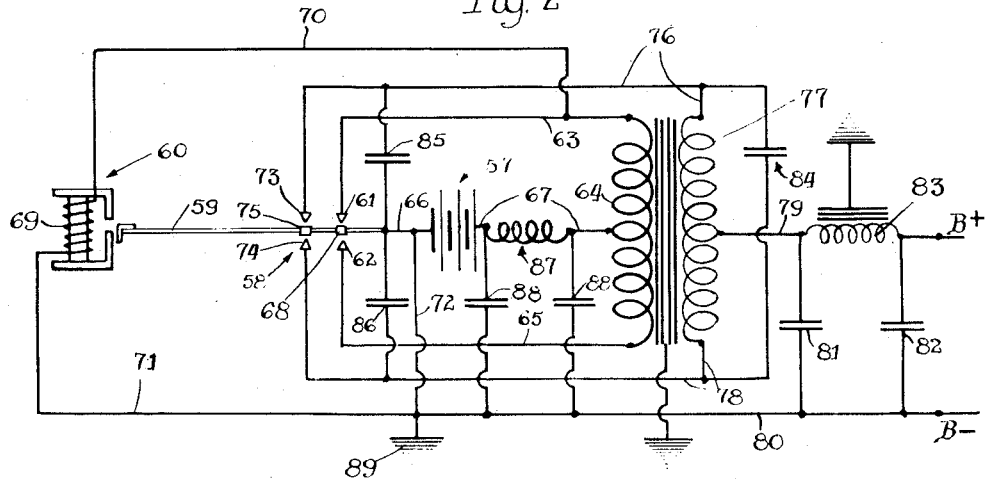
Figure 2 is a wiring diagram illustrating a modification of the circuit shown in Fig. 1.

Systems which employ mechanical rectifying means replace the rectifier valve with circuit making and breaking means which is mechanically controlled in such manner that, generally speaking, only that portion of the alternating current from the secondary coil which is flowing in the proper direction is passed to the filter system. Fig. 2 illustrates a wiring diagram of a modified form of the direct current transforming system shown in Fig. 1 and which embodies a mechanical rectifying device. For convenience this system will hereinafter be termed the mechanical rectifier system as distinguished from the valve rectifier system shown in Fig. 1. Therein, the numeral 57 designates a storage battery of the vehicle. The circuit interrupting device, generally indicated at 58, is substantially of the same construction as that shown and described in my Patent No. 1,924,082, issued August 22, 1933. This structure embodies a vibratory reed 59 which is actuated by intermittent energizations of an electromagnet 60 alternately to establish circuits through one or the other of a pair of opposed contacts 61, 62. The contact 61 is connected by a lead 63 with one end of a transformer primary winding 64, the other end of said winding being connected by a lead 65 with the other contact 62. The reed is connected by a lead 66 with one side of the storage battery 57 and the other side of the storage battery is connected by a lead 67 with an intermediate point or center tap of the primary winding. The vibratory reed carries a double contact 68 for cooperation with one or the other of the contacts 61, 62. The winding 69 of the electromagnet 60 is connected by a lead 70 with the lead 63 and the other side of said winding is connected by leads 71, 72 with lead 66 between the reed and the battery.

The reed has a normally untensioned position wherein the contact 68 is out of engagement with both of the contacts 61, 62. Consequently when the circuit is initially closed by a master or control switch (not shown), the electromagnetic winding 69 is immediately energized through the following circuit: From the battery 57, through leads 66, 72, 71, winding 69, leads 70, 63, one-half of primary winding 64, and lead 67 to the battery. This circuit constitutes a starting circuit. The reed 59 is normally positioned at one side of the center of the magnetic force exerted by the electromagnet 60 and the parts are so related that the reed is initially swung to establish a circuit through the double contact 68 and the contact 61 or 62 which is connected with that portion of the primary winding included in the starting circuit. As illustrated, the reed is initially swung to establish a circuit across the contacts 68 and 61. When this circuit is closed the electromagnet is shunted out of the energizing or starting circuit and is effectively deenergized thereby to release the vibratory reed for a return swinging movement. Simultaneously, it will be seen that an energizing circuit for the primary winding is completed from the storage battery through lead 66, reed 59, contacts 68, 61, lead 63, one end of primary winding 64, and lead 67 to the battery. The return swinging movement of the vibratory reed establishes a circuit through contacts 68, 62 to energize the other half of the primary winding but in an opposite direction. As the circuit between contacts 68, 61 is broken, the shunt circuit is opened and the electromagnet is again energized to complete the cycle.

Thus far the structure which has been described is substantially the same as the structure and circuit relationship disclosed in my aforesaid patent. The present vibratory motor departs from my earlier disclosure in that a second series of contacts 73, 74 and 75 are provided which are the same as the contacts 61, 62 and 68. In Fig. 2 the two series of contacts are diagrammatically shown as being alined longitudinally of the reed. In actual practice, however, the two series are alined transversely of the reed so that the circuits controlled by said contacts will be made and broken substantially in timed coincidence.

Contacts 73, 74 and 75, together with the vibratory reed which controls the circuits therethrough constitute the instrumentality for mechanically rectifying the alternating current from the secondary winding. These rectifier contacts are included in the rectifying system in the following manner: Contact 73 is connected by a lead 76 with one end of secondary winding 77 and contact 74 is connected by a lead 78 with the other end of the secondary winding. The rectifying circuit is completed for connection with a filter system by a lead 79 from an intermediate or center tap of the secondary winding 77 and by a lead 80 which is connected with the reed through lead 72. The filter system in this embodiment comprises two separate condensers 81, 82 connected across the leads 79, 80 and an iron core choke coil 83 interposed in the lead 79 between the points of connection of the condensers 81, 82 therewith.

In the operation of the system, vibratory movement of the reed 59 establishes a circuit first through contacts 61, 68 to energize one-half of the primary winding 64 and then through contacts 68, 62 to energize the other half of the winding in the opposite direction. As a result of this energization of the primary winding, an alternating current of high potential is induced in the secondary winding 11. Simultaneously with the closing of the contacts to energize the divided halves of the primary winding the rectifier circuits are closed first through contacts 73, 75 and then through contacts 75, 74, and these contacts, when closed, are intended to pass to the filter system only that portion of the alternating current which is flowing in one direction, whereby the filter system receives a pulsating direct current which is delivered to the output terminals by said filter system as substantially pure direct current. However, it is impossible, as a practical matter, properly to coordinate the making and breaking of the rectifier circuits with the cyclic variations of potential of the alternating current in such manner that accurate and efficient rectification of the alternating current is obtained. For this reason, capacitance in the form of a condenser 84 is connected across the secondary winding 71 between the secondary winding and the rectifier contacts 73, 74 and 75. The capacity of the condenser 84 must be properly correlated with the other elements of the system, as will hereinafter be more fully discussed, in order to produce efficient rectification without sparking at the rectifier contacts.

The condenser 84 may have a capacity of itself which is proper for the entire system, or, as shown in Fig. 2, other condensers 85 and 86 may be connected in shunt with the contacts 73, 75 and 75, 74, respectively, in such manner that the condensers 85, 86 are in series with each other and are in parallel with the condenser 84. As long as the total capacity of the condensers 84, 85 and 86 is the same as the proper capacity of the condenser 84 when the condenser 84 is used alone, the ultimate result of the several condensers is unchanged.

If desired, and in order to avoid transmission of interference effects from the system to the storage battery, an inductance 87, in the form of an air core choke coil, may be interposed in the lead 67 between the battery and the center tap of the primary winding. When such inductance is used, a condenser 88 of small capacity should be connected across leads 67 and 71 on each side of inductance 87 to ground through the grounded side of the battery as indicated at 89.

The mechanical rectifier differs from the rectifier valve in several respects which have an important bearing upon the proper operation of the different systems. Thus, a reverse flow of current from the filter system through the rectifier may occur in the mechanical rectifier system whenever the rectifying circuit is closed while the potential in the filter system is higher than the potential of the current in the secondary winding. Therefore, the mechanical rectifier cannot adjust itself automatically, as does the rectifier valve, to insure definitely that only that current, which flows from the secondary winding in the proper direction and is of higher potential than that of the filter system, passes to said system. Consequently it is necessary to adjust a mechanical rectifier system to approximate this requirement as nearly as possible.

The factors which must be taken into consideration in making this adjustment can best be understood by considering a mechanical rectifying system under conditions of operation. Due to the intermittent energizations of the primary winding an alternating current having relatively great variations of potential throughout each cycle is produced in the secondary winding. After rectification of the current, the filter system is charged with a direct current of substantially constant potential. This potential is much greater than the minimum potential which occurs in each cycle of the alternating current and, likewise, is much less than the maximum potential which occurs at other parts of said cycle. It is obvious that if a circuit is completed, between the secondary winding and the filter system, by the closing of the rectifier contacts at a time when the varying potential from the secondary winding is less than the substantially direct current potential in the filter system, current will flow from the system into the secondary winding. This action is disadvantageous because it results in an undesirable drain on the filter system and thereby decreases the efficiency of the entire system.

There is, however, a more serious disadvantage resulting from an improper coordination of the points of make and break of the rectifier contacts with the cyclic fluctuations of the potential of the alternating current. Consider, for example, that the rectifier points are about to make, or in other words, that the rectifying circuit is about to be closed and that the secondary winding potential is either substantially higher or substantially lower than the potential in the filter system. As the contacts engage, this potential difference will produce sparking between the contacts, since, if there is a high potential difference across the contacts, the potential will tend to equalize across the gap between the contacts, with resultant sparking. Even if the potential difference is not great enough to cause sparking across the gap between the contacts, a relatively small potential difference will produce sparking as the contacts meet. If the same conditions obtain when the circuit is broken, the same result will occur except that the sparking takes place as or just after the contacts separate. To correct this difficulty and to eliminate sparking in a mechanical rectifier system, it therefore becomes necessary to make or break the circuit through the contacts substantially when the potential difference between the secondary winding and the filter system is zero.

It has been discovered that this result can be obtained by properly correlating the several elements constituting the entire mechanical rectifier system, and particularly with reference to the rectifier, the transformer and the condenser, which shunts the transformer. When any of these elements have definite electrical characteristics, an adjustment or setting of the electrical characteristics of one or all of the remaining elements can be made to cause the rectifier contacts to make and break the circuit when the potential difference across the points is substantially zero. Thus, with a mechanical rectifier wherein the contacts are recurrently engaged by the action of a vibratory reed, the electrical characteristics of the device are primarily a result of the amplitude of swing of the reed and the normal gap provided between the contacts. In a transformer, the electrical characteristics are primarily due to the number of turns in the primary winding, and to the quantity and quality of iron used in the transformer construction. In the condenser, the electrical characteristic of primary importance is the capacity thereof. An adjustment of the electrical characteristics of the interrupting device will also affect the correlation of the elements of the system.

As an example of a proper adjustment, let it be presumed that the electrical characteristics of the rectifier and of the transformer are fixed. Without any capacitance across the secondary, heavy sparking across the contacts will occur. If a condenser of low capacity is connected in shunt across the secondary, the sparking will be substantially reduced and this reduction of sparking will continue as the capacity of the condenser is increased until the proper capacity is reached when sparking is eliminated. If the capacity of the condenser is variably increased beyond this proper value, sparking will again occur across the contacts in gradually increasing intensity. The proper capacitance has, therefore, produced a proper correlation of the several elements of the system by causing an approximate timed coincidence of the instant at which the rectifying circuit is made or broken and the instant at which the potential difference across the contacts is zero. In other words, the changes in the condition of the output or rectifying system are timed by the condenser to occur when the varying potential in the secondary approximates the value of the direct current potential in the filter system. The elimination of sparking, therefore, results from the establishment or interruption of the rectifier circuit when there is substantially no current flow across the points in either direction, and any attempt to rectify the secondary potential at any other time, as, for instance, when the secondary potential is changing its polarity at the point of zero potential, will inevitably produce sparking.

The connection of a condenser of proper capacity across and immediately adjacent to one of the windings of the transformer produces a further important result. If in a system such as that shown in Fig. 2, no load is present on the output circuit to absorb the current from the secondary winding the vibratory reed will be initially drawn toward the contact 61 first engaged thereby and thereafter may have a fluttering action with respect to this contact such that it will not move through its full amplitude of swing until a current is drawn from the secondary winding. This fluttering action of the reed or movement thereof through less than its complete amplitude of swing causes an exceedingly heavy current drain on the battery with a resulting very rapid deterioration of the contact points. When the vibratory reed type of circuit interrupter, utilizing the starting circuit shown in Fig. 2, is employed in connection with a valve type of rectifier system similar to that shown in Fig. 1, the fluttering action of the vibratory reed will be encountered during the initial starting period since there is no load upon the circuit in which the secondary winding is connected as long as the rectifier valve is cold. This fluttering action, it has been found, is entirely eliminated by the capacitance which shunts a winding of the transformer. In the mechanical rectifying system, that capacity value which causes the rectifier contacts to engage and disengage when the potential difference therebetween is substantially zero will also prevent the fluttering action of the vibratory reed. However, when the system is used with a rectifier valve, the capacity of the shunted condenser must be substantially greater than the minimum capacity otherwise required, in order to produce a proper operation of the system in order to eliminate the fluttering action of the reed.

I claim as my invention:

1. A "B" battery eliminator for a motor vehicle installation of a radio receiving set comprising, in combination, a transformer having a primary winding adapted to be connected with a source of direct current of relatively low potential, a circuit interrupting device for interrupting the current flow to the primary winding, rectifying means, a transformer secondary winding connected with said rectifying means, capacitance connected across the secondary winding between said winding and said rectifying means, and output leads from said rectifying means and said secondary winding.

2. A direct current transforming device of the character described comprising, in combination, a transformer having primary and secondary windings, a circuit for connecting said primary winding with a source of direct current of relatively low potential and including a circuit making and breaking instrumentality for interrupting the current flow to the primary winding, an output circuit connected with said secondary winding including a rectifying instrumentality, and capacitance in shunt relation to one of said windings and connected to one side of the circuit for said winding at a point between the said winding and the one of said instrumentalities which is in said circuit.

3. A direct current transforming device of the character described comprising, in combination, a transformer, an input circuit for connecting one side of said transformer with a source of direct current of relatively low potential and including a circuit making and breaking instrumentality for interrupting the current flow to said transformer, an output circuit connected with the other side of said transformer and including a rectifying instrumentality, and capacitance in shunt relation to one side of said transformer and connected to one side of one of said circuits at a point between said transformer and the one of said intrumentalities which is in the last-mentioned circuit.

4. In a direct current transforming system, the combination of a transformer; an input circuit to said transformer including circuit interrupting means; and an output circuit from said transformer including a rectifying means having mechanically actuated circuit making and breaking contacts, a filter system, and capacitance connected into one of said circuits; said circuit interrupting means, said transformer, and said capacitance having electrical characteristics fixed to a correlated condition wherein the output circuit is established and interrupted when the potential difference on the contacts of said rectifier means is approximately zero.

5. In a direct current transforming system, the combination of a transformer; an input circuit to said transformer including circuit interrupting means; and an output circuit from said transformer including a rectifying means having mechanically actuated circuit making and breaking contacts, a filter system, and capacitance connected into said output circuit between said transformer and said rectifying means; said circuit interrupting means, said transformer, and said capacitance having electrical characteristics adjusted to a correlated condition wherein the output circuit is established and interrupted when the potential difference on the contacts of said rectifier means is approximately zero.

6. In a direct current transforming system, the combination of a current transforming device; an input circuit to said transforming device including a circuit interrupting device; and an output circuit from said transforming device including a rectifying device having circuit making and breaking contacts, a filter system, and a capacitance device connected into one of said circuits; any one of said aforementioned devices having electrical characteristics set to correlate the remaining devices to a condition wherein, when said contacts are at the point of establishing or interrupting the output circuit, the potential of the output side of the transformer will be substantially equal to the potential of the filter system.

7. In a direct current transforming system, the combination of a current transforming device; an input circuit to said transforming device including circuit interrupting means; and an output circuit from said transforming device including a rectifying device having circuit making and breaking contacts, a filter system, and a capacitance device connected into said output circuit between said transformer device and said rectifying device; said capacitance device having a capacity predetermined according to the electrical characteristics of the remaining devices to produce a condition wherein, when said contacts are at the point of establishing or interrupting the output circuit, the potential of the output side of the transformer will be substantially equal to the potential of the filter system.

8. In a direct current transforming system, the combination of a transformer, an input direct current circuit to said transformer including a circuit interrupting device having a vibratory reed, a rectifying output circuit from said transformer, and means included in one of said circuits for insuring vibration of said reed through its full amplitude of swing under starting conditions in which there is no load on said output circuit.

9. In a direct current transforming system, the combination of a transformer, a direct current input circuit connected with said transformer, an interrupting device in said circuit including a circuit controlling vibratory reed and an electromagnet intermittently energizable to effect the vibratory movement of said reed and having a starting circuit connected to be shunted out upon establishment of a circuit controlled by said reed, an output rectifying circuit from said transformer, and a condenser connected in one of said circuits in shunt with said transformer, said condenser having a capacity ample to prevent vibration of said reed at less than its full amplitude of swing under conditions of no load on the output circuit.

10. In combination with a voltage change device, a vibrating means having a single magnetic vibrator motor, and provided with series contacts for interrupting a primary current and for rectifying an alternating secondary voltage, and means for bringing the points of zero current value of the secondary current substantially into phase with the interruptions of said primary current.

11. In combination with a transformer having primary and secondary windings, a vibrating means having a single magnetic vibrator motor, and provided with series of contacts for interrupting a primary current and for rectifying an alternating secondary voltage, some of said contacts also controlling the magnetic vibrator motor, and means for reducing sparking at the contacts, the last mentioned means also providing a by-pass tending to eliminate high and radio frequency currents from the rectifying contacts.

12. In combination with a voltage change device, a vibrating means having a magnetic vibrator motor, and provided with series of contacts for interrupting a primary current and for rectifying an alternating secondary voltage, mechanically adjustable means and electrical means for improving the operating efficiency of the combination.

EDWARD L. BARRETT.